Jan. 20, 1959 D. D. CORDRY 2,869,787
REFRIGERATION LOAD CALCULATOR
Filed May 2, 1956 2 Sheets-Sheet 1
Fig. 1.
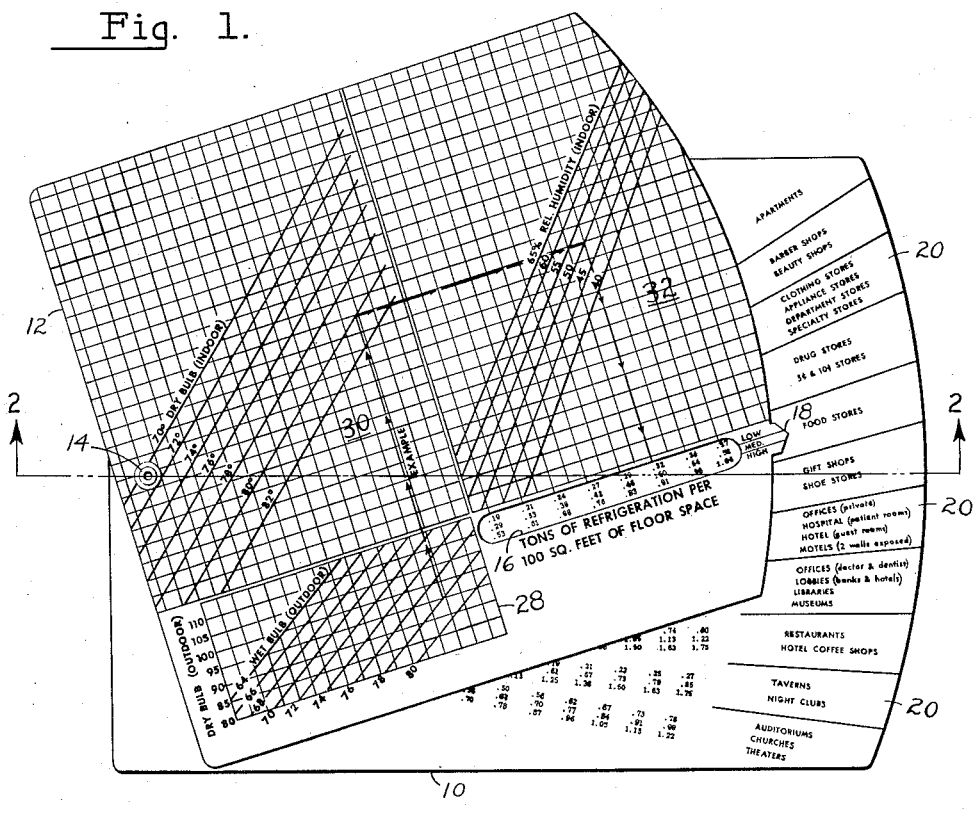
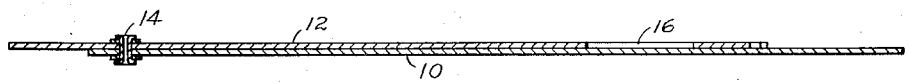
Fig. 2.
INVENTOR.
DAVID D. CORDRY
BY
Holmes & Andrusen
ATTORNEYS Jan. 20, 1959     D. D. CORDRY     2,869,787
REFRIGERATION LOAD CALCULATOR Filed May 2, 1956     2 Sheets—Sheet 2

INVENTOR.
DAVID D. CORDRY
BY
Holmes & Andersen
ATTORNEYS

United States Patent Office 2,869,787
Patented Jan. 20, 1959

2,869,787
REFRIGERATION LOAD CALCULATOR

David D. Cordry, La Crosse, Wis., assignor to The Trane Company, La Crosse, Wis., a corporation of Wisconsin Application May 2, 1956, Serial No. 582,219

1 Claim. (Cl. 235—61)

This invention relates to calculators and particularly to calculators for determining the refrigeration requirements of various types of conditioned rooms.

It is an object of this invention to provide a slide rule calculator which is inexpensive to construct and which is easy to use.

It is an object of this invention to provide a mechanical rule which, with a single setting, determines the refrigeration requirements of a given type of room having a given type of occupancy.

Other objects and advantages will appear as the specification proceeds to describe the invention with reference to the accompanying drawings; in which—

Fig. 1 is a plan view of the slide rule calculator of this invention.

Fig. 2 is a cross-sectional view taken on line 2—2 of Fig. 1.

Figure 3:
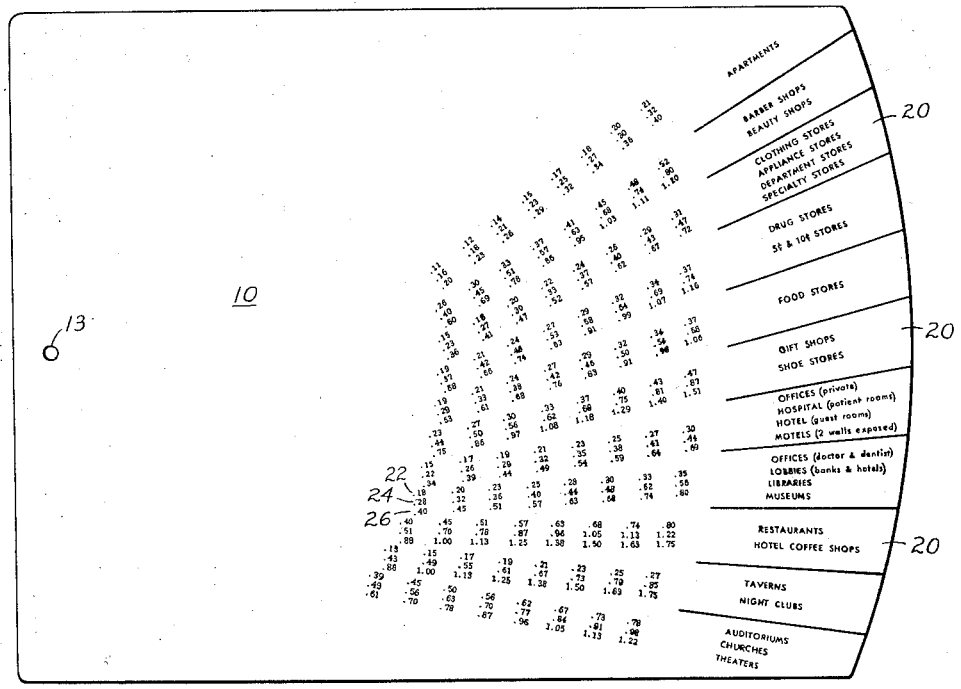
Fig. 3 is a plan view of the base member of the slide rule calculator.
Figure 4:
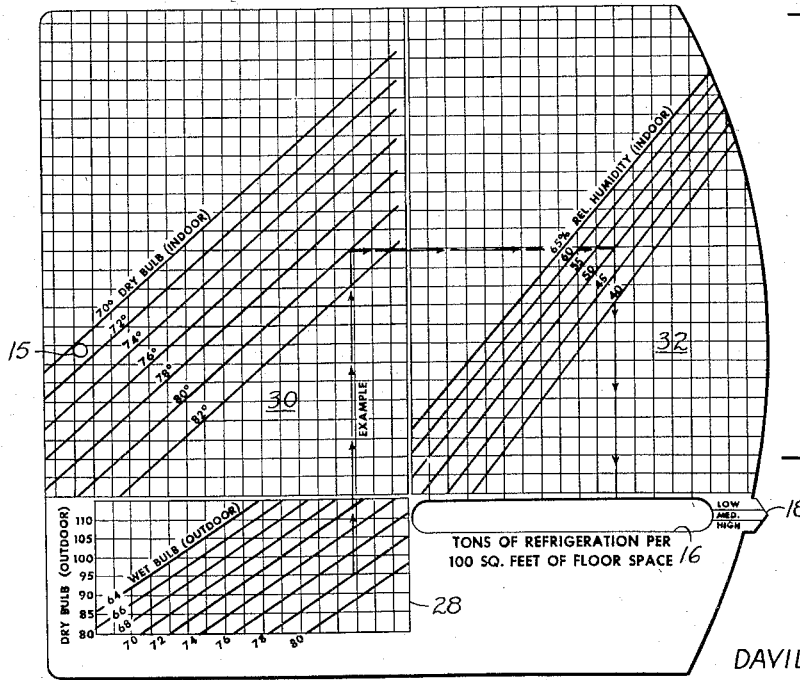
Fig. 4 is a plan view of the slide member of the slide rule calculator.

Referring now to Fig. 1, a base member 10 and an indexable member 12 are rotatably secured to each other by a rivet 14 which extends through the members 10 and 12 substantially at their adjacent ends. Base member 10 has a hole 13 for receiving rivet 14, and indexable member 12 has a hole 15 for the same purpose.

Indexable member 12 has a straight slot 16 offset downwardly from the pivot point at the rivet 14. The indexable member 14 has a pointer 18 in alignment with slot 16. The base member 10 at its end remote from the rivet 14 is divided into spaces 20 according to the type of the conditioned room. Aligned with each of the spaces 20 are three scales 22, 24, and 26 in tons of refrigeration. The slot 16, the spaces 20, and the scales 22, 24, and 26 are all substantially tangent to a circle the center of which is at rivet 14.

The indexable member 12 has a scale 28 of outdoor dry bulb and outdoor wet bulb design temperatures, a scale 30 of the indoor dry bulb temperature desired and a scale 32 of the indoor relative humidity desired.

The manner in which the calculator is used will now be described. The slide member 12 is first rotated to a position in which the pointer 18 is in the center of the space 20 containing a description of the use of the building. One set of scales 22, 24, and 26 is then located beneath the slot 16. The point on scale 28 where the outdoor wet bulb and outdoor dry bulb design temperatures intersect is then found. From this point a line is projected parallel to the ordinates of scale 28 and scale 30 to the desired indoor dry bulb point on scale 30. From this point on scale 30 a line is projected parallel to the abscissas of scale 30 and scale 32 to the desired indoor relative humidity on scale 32. From this point on scale 32 a line is projected downwardly parallel to the ordinates of scale 32 to numbers on the scales 22, 24, and 26 which appear through the slot 16. Scales 22, 24, and 26 represent the refrigeration requirements for spaces having respectively low, medium, and high heat gains. The scale to be used depends on the heat gains of the conditioned room taking into account the amount of exposure, the type of insulation, the area exposed to direct sunshine, number of occupants and so on.

While I have described the foregoing preferred embodiment of my invention, I contemplate that various changes may be made without departing from the scope and spirit of my invention and I desire to be limited only by the claim.

I claim:

A calculator for determining the refrigeration requirements of a room comprising a base member, an indexable member, means pivotally mounting said indexable member on said base member, a first scale on said base member and having refrigeration requirements for various types of rooms, a slot in said indexable member uncovering selected portions of said first scale, a second scale of outdoor dry bulb and wet bulb temperatures on said indexable member, a third scale of indoor dry bulb temperature on said indexable member, a fourth scale of indoor relative humidity on said indexable member, said second and third scales having aligned ordinates, said third and fourth scales having aligned abscissas whereby a point on said second scale may be projected parallel to said aligned ordinates to a point on said third scale and then the point on said third scale may be projected parallel to said abscissas to a point on said fourth scale, and ordinates on said fourth scale intersecting said slot whereby the point on said fourth scale may be projected parallel to said lines to a point on said first scale.

References Cited in the file of this patent
UNITED STATES PATENTS

| | | |
|---|---|---|
| 871,417 | Kenyon | Nov. 19, 1907 |
| 1,087,445 | Herrick | Feb. 17, 1914 |